US005612955A

United States Patent [19]
Fernandes et al.

[11] Patent Number: 5,612,955
[45] Date of Patent: Mar. 18, 1997

[54] MOBILE RADIO WITH TRANSMIT COMMAND CONTROL AND MOBILE RADIO SYSTEM

[75] Inventors: Julian V. Fernandes, Swindon; Hugh C. Dunlop, London, both of United Kingdom

[73] Assignee: Motorola, Inc., Schaumburg, Ill.

[21] Appl. No.: 408,097

[22] Filed: Mar. 21, 1995

[30] Foreign Application Priority Data

Mar. 23, 1994 [GB] United Kingdom .................. 9405752

[51] Int. Cl.⁶ ...................................................... H04J 3/17
[52] U.S. Cl. ............................ 370/433; 370/528; 455/83
[58] Field of Search ................................. 370/13, 17, 32, 370/31, 68.1, 110.1, 111, 95.1, 95.3, 85.3, 80, 85.6, 118, 79, 81; 455/229, 83, 78, 79, 80, 82, 67.1, 70, 54.1; 375/219

[56] References Cited

U.S. PATENT DOCUMENTS

| 4,060,764 | 11/1977 | Bethards et al. | 455/83 |
| 4,305,154 | 12/1981 | Deman et al. | 455/83 |
| 5,418,784 | 3/1995 | Ramakrishnan et al. | 370/85.3 |
| 5,524,274 | 6/1996 | Takahashi et al. | 455/83 |

*Primary Examiner*—Wellington Chin
*Assistant Examiner*—Huy D. Vu
*Attorney, Agent, or Firm*—Heather L. Creps

[57] ABSTRACT

A mobile radio for operation in a system includes a plurality of mobile radios, in which each mobile radio transmits, selectively, traffic frames containing traffic data responsive to inputting of information to the mobile radio when the mobile radio is in an active transmit state of operation, and silence descriptor frames responsive to absence of input information when the mobile radio is in active transmit state of operation. The mobile radio includes: a transmitter for transmitting traffic on a radio channel; a receiver for monitoring signals on the radio channel; a control input for inputting a transmit command; a controller, responsive to the receiver and responsive to the control input, for controlling the transmitter, where the controller is arranged to enable activation of the transmitter, when the receiver detects continuous silence descriptor frames on the radio channel for a predetermined duration and a transmit channel command is input at the control input.

12 Claims, 2 Drawing Sheets

MOBILE RADIO WITH TRANSMIT COMMAND CONTROL AND MOBILE RADIO SYSTEM

FIELD OF THE INVENTION

This invention relates to a mobile radio for operation in a system having a discontinuous transmission function. It also relates to a mobile radio system. An example of a mobile radio system with a discontinuous transmission function is the Groupe Speciale Mobile (GSM) system. This invention is particularly applicable to the provision of private mobile radio features for a radio system such as a GSM system.

BACKGROUND OF THE INVENTION

In a GSM system the transmission of speech over the radio interface can be governed by discontinuous transmission/reception. In this mode the radio modem transmitter is turned off during the silence period in a conversation except for the occasional transmission of the Silence Descriptor (SID) frame. When speech returns, speech frames are transmitted continuously. Each frame encodes a 20 ms slot.

In the transmitter radio subsystem the presence or absence of speech is indicated by a speech flag (SP) which is provided by the speech encoder algorithm. When SP=1, speech frames are sent and when SP=0 SID frames are synthesised and transmitted every 24 frames.

At the receiver, the channel decoder is able to differentiate between a) speech frames b) SID frames and c) bad frames. This differentiation is achieved by monitoring the frame type indicator. The absence of frames (silence) can be detected by the equaliser which will not receive a training sequence in that state.

Providing for group calls using a GSM based system in a spectrally efficient manner involves the utilisation of the same uplink and downlink traffic channel (TCH) by all the mobiles in the group.

Considering the fact that only one mobile is permitted to talk (and therefore broadcast) at any one time we have a push-to-talk (PTT) scenario. When one mobile is broadcasting all the others should be inhibited from transmitting. In a simple system the users are relied upon to refrain from speaking when the channel is free.

In known PMR systems, it has been proposed that the existence of carrier on the channel inhibits the PTT function in a mobile radio, thereby giving a orderly contention for access to the channel. This is a crude arrangement which can result in one user "hogging" the channel, deliberately or inadvertently. Inadvertent hogging of the channel can take place when a user forgets to release the PTT button.

There is a need for a more flexible manner of group contention.

SUMMARY OF THE INVENTION

According to the invention, there is provided a mobile radio for operation in a system comprising a plurality of mobile radios, in which each mobile radio transmits, selectively, traffic frames containing traffic data responsive to inputting of information to the mobile radio when the mobile radio is in an active transmit state of operation, and silence descriptor frames responsive to absence of input information when the mobile radio is in an active transmit state of operation, the mobile radio comprising: a transmitter for transmitting traffic on a radio channel; a receiver for monitoring signals on the radio channel; a control input for inputting a transmit command; control means, responsive to the receiver and responsive to the control input, for controlling the transmitter, where the control means are arranged to: suppress, initially, the transmitter and later enable activation of the transmitter, when the receiver detects silence descriptor frames on the radio channel and a transmit command is input at the control input.

The input information may be speech and the control input may be a PTT input. In this manner, a user who continues to press his PTT but stops speaking into his microphone does not hog the channel, because another mobile radio detecting the resulting silence descriptor frames is able to activate his transmitter after the initial suppression of this transmitter.

It is preferred that the control means are further arranged to activate the transmitter in response to a transmit command when the receiver detects no traffic frames and no silence descriptor frames on the radio channel. It is further preferred that the control means are arranged to suppress the transmitter in response to a transmit command when the receiver detects traffic frames on the radio channel.

The later activation of the transmitter may be after a predetermined duration of continuous silence descriptor frames, or after a predetermined number of silence descriptor frames.

The period of suppression of the transmitter may commence independent of the pressing of the PTT by the user, such that if the continuous sequence of silence descriptor frames extending over a predetermined duration has been detected immediately prior to pressing the PTT, the transmitter can be activated promptly.

In a very simple form, the transmitter disabling and enabling may be indicated by an indicator, such as a light emitting diode or comfort noise, such that the user receives and indication as to when the channel is considered "free" and when the user may press the PTT. It is preferred, however, that the enabling and disabling of the transmitter enables and disables the PTT automatically.

A preferred embodiment of the invention is now described, by way of example, with reference to the drawings.

DETAILED DESCRIPTION OF THE PREFERRED EMBODIMENT

Figure 1:
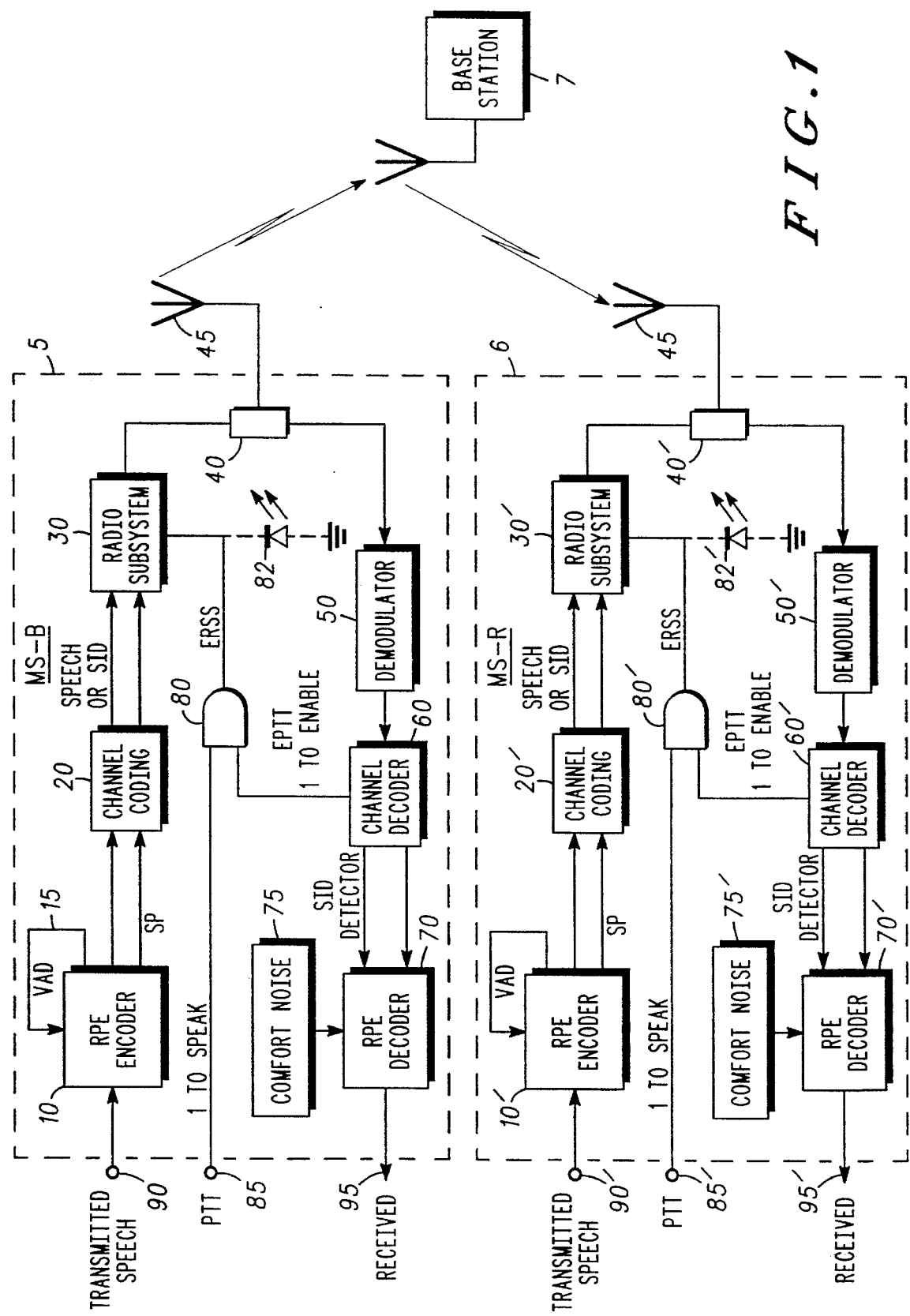
FIG. 1 shows details of first and second mobile radios, each in accordance with the invention, communicating via a base station.

Referring to FIG. 1, two mobile radios 5 and 6 are shown communicating via a base station 7. The mobile radios communicate under the control of the radio station 7, which allocates a single uplink channel and a single downlink channel for group communication between the mobile radios 5 and 6 and other mobile radios in a common group. It is the aim that one mobile radio should transmit at any given time and all the other mobile radios in the group should receive the traffic transmitted. Any one of the other radios in the group may wish to enter into the conversation after contending for the channel.

The case will be considered where mobile radio 5 is a broadcasting mobile radio and mobile radio 6 is a receiving mobile radio.

Each of the radios 5 and 6 comprises a residual pulse excitation (RPE) speech coder function 10. The speech coder function has a voice activity detector (VAD) which generates a flag 15, which is used to generate the speech flag (SP). An output of the RPE encoder and the SP flag are fed to a channel coder 20, which synthesizes baseband frames from speech prior to modulation in a radio subsystem (RSS) 30. The output of the RSS is fed to a duplexer 40 and an antenna 45. Also connected to the duplexer 40 is a receiver demodulator 50, which passes demodulated received signals to a channel decoder 60, which in turn passes speech frames or silence indicator descriptor (SID) frames to an RPE decoder 70, for outputting to a loudspeaker on output 95. A gate 80 receives a press-to-talk (PTT) signal on input 85 as well as enable PTT (EPTT) flag from channel decoder 60 and provides an enable RSS signal to the radio subsystem 30. An optional light emitting diode 82 indicates the state of the output of the gate 80.

In operation, the encoder 10 encodes speech from a traffic input 90 (eg. connected to a microphone) and passes the encoded speech to a channel coder 20, for compilation of speech frames for transmission. When the VAD detects no voice, the SP flag changes from 1 to 0 and the channel coder 20 commences generating SID frames. In each case of speech frames or SID frames, the RSS 30, upon receipt of a positive ERSS signal from gate 80, transmits these frames onto the channel.

The transmitted signals are received by mobile radio 6, which has the same construction as mobile radio 5. Elements 10' to 95' of mobile radio 6 correspond to elements 10 to 95 of mobile radio 5.

Mobile radio 6 receives the signals from mobile radio 5 and demodulator 50' demodulates signals and passes them to channel decoder 60', which extracts from the frames of signals the available speech data or SID indicators. These are passed to RPE decoder 70'. Speech frames are decoded as speech and output on audio output 95'. SID frames are replaced by comfort noise from comfort noise generator 75', thereby giving the user the impression that the channel is busy by virtue of random background noise.

For so long as speech frames are received by channel decoder 60', a "0" is output to gate 80', thereby disabling any signal input on PTT input 85' and disabling radio subsystem 30'.

In this state, the transmitter of the radio subsystem 30' is suppressed in response to any transmit command of the PTT input 85' when the channel decoder 60' on the receive side of the mobile radio 6 detects traffic frames on the radio channel.

When the mobile radio 5 commences transmitting SID frames, these are received and counted in channel decoder 60'. A period of time or a number of frames, is/are allowed to lapse, giving the user of mobile radio time to pause between sentences. If SID frames continue to be received by channel decoder 60' after that period of time or that number of frames a "1" is output to gate 80', thereby enabling a signal on PTT input 80' to activate the transmitter of RSS 30'.

Thus the user of mobile radio 6 is free to transmit on the channel if the user of mobile radio 5 falls silent/or more than an allowed time, even if the user of mobile radio 5 continues to press his PTT button.

Should the user of mobile radio 6 press his PTT button and start speaking, speech frames will be at the output on the channel and will be received by channel decoder 60 in mobile radio 5, in turn generating a "0" on the output to gate 80, in turn disabling radio subsystem 30 and halting the further generation of SID or speech frames by mobile radio 5.

Figure 2:
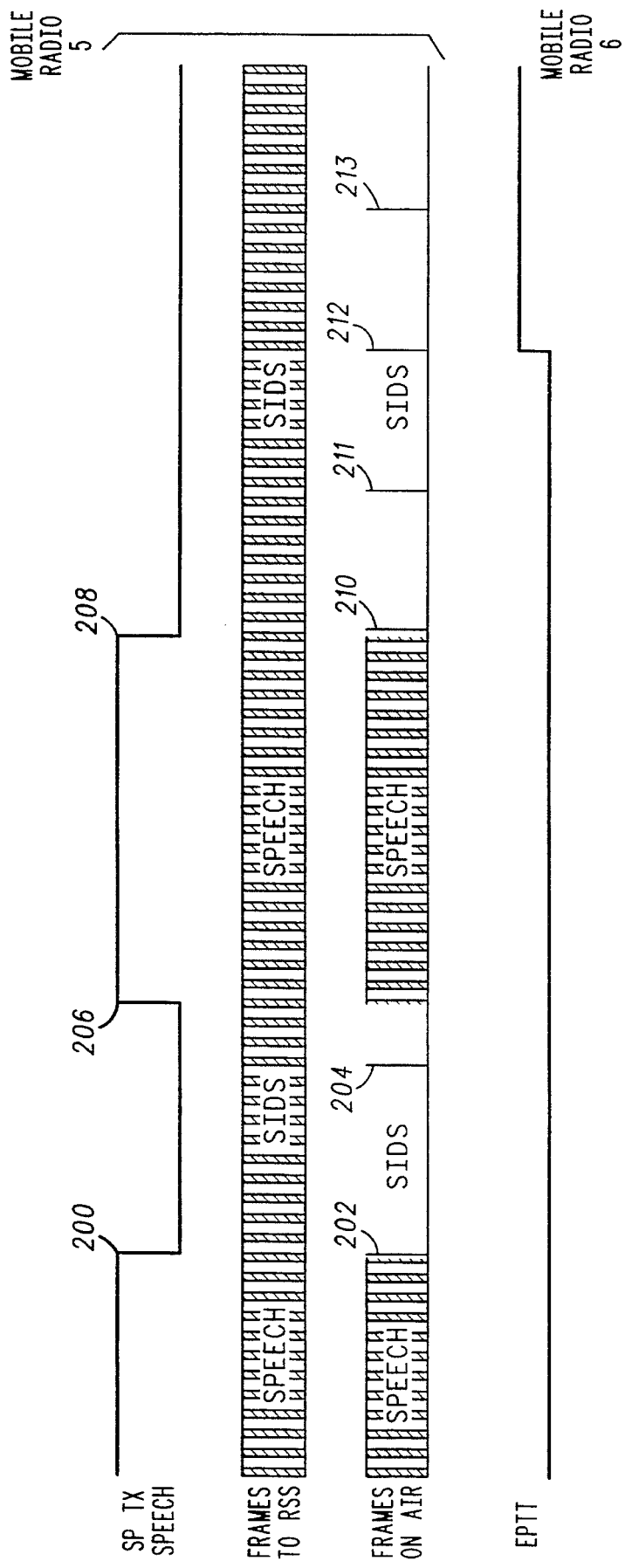
FIG. 2 shows time diagrams for explanation of the preferred embodiment of the invention.

This operation is illustrated in FIG. 2. The upper part of FIG. 2 illustrates the signals transmitted by mobile radio 5 and the lower part illustrates the EPTT signal from channel coder 60' to gate 80' in mobile radio 6.

Initially, the SP flag is high and speech flames are passed to RSS 30 and transmitted. When the user of mobile radio 5 pauses in speech, the SP flag falls low at transition 200 the first, 202, of a series of SID flames is transmitted by the mobile radio. In the example shown, a second SID frame 204 is transmitted, before the SP flag changes to high at transition 206 and speech frames are again output to the RSS 30 and transmitted. During this time, there is no change in the EPTT signal in mobile radio 6.

A longer pause commences at transition 208 of the SP flag and SID frames are 210, 211, 212 and 213 are transmitted.

The channel decoder 60' counts these SID frames and, in the illustrated example, allows the EPTT signal to change to "high" upon the third frame 202. Mobile radio user 6 is now permitted to transmit and, if he does so, he will take over access of the channel from mobile radio user 5. If the user of mobile radio 5 commences speaking again before the user of mobile radio 6 presses his PTT and commences speaking, mobile radio user 5 will still have priority on the channels.

Genuine silence (the broadcaster's PTT is in the "off" position) is detected by identifying the absence of SID or speech frames. Note that an SID frame is sent soon after a pause is detected so that genuine silence can be quickly detected by the absence of a SID frame.

Access to the channel is allowed when the broadcaster's PTT button is turned off or after a predetermined pause period. Considering that SID frames are transmitted during a pause, the allowed pause period can be implemented in the receiver function by counting a number of SID frames before enabling block 80. In the figure, the two periods between SID frames are counted (equivalent to 1 second delay) but a larger number of SID frames can be counted. A delay of several seconds can be allowed, giving the speaker a very long opportunity to pause during speech, but with the disadvantage that another user wishing to have access to the channel has to tolerate a longer delay before being granted access.

Different mobiles can be given different access priority criteria. Thus, a high priority mobile can be allowed "zero" delay when SID frames are output on the channel, that is to say the higher priority mobile is immediately able to break into a pause in the speech of a lower priority mobile. Alternatively, the lower priority mobile is able to turn EPTT on only when genuine silence is detected and not when the SID frames are detected.

Accordingly, in another aspect of the invention, a mobile radio system is provided comprising a high priority mobile radio and a low priority mobile radio, in which each mobile radio transmits, selectively, traffic frames containing traffic data responsive to inputting of information to the mobile radio when the mobile radio is in an active transmit state of operation, and silence descriptor frames responsive to absence of input information when the mobile radio is in an active transmit state of operation. Each mobile radio comprises a transmitter for transmitting traffic on a radio channel, a receiver for monitoring signals on the radio channel, a control input for inputting a transmit command and control means responsive to the receiver and responsive to the control input, for controlling a transmitter. The control means of the high and low priority mobile radios are arranged to activate the respective transmitters according to different criteria when the respective receiver detects silence descriptor frames on the radio channel and a transmit command is input at the control input.

The different criteria may be that the high priority mobile radio enables activation of its respective transmitter when the respective receiver detects silence descriptor frames on the radio channel and a transmit command is input at its respective control input and the low priority radio disables activation of its respective transmitter when the respective receiver detects silence descriptor frames on the radio channel and a transmit command is input at the respective control input.

Alternatively, the control means of the high priority mobile radio may enable activation of its respective transmitter with relatively low delay, for example "zero" delay, and the low priority radio enables activation of its respective transmitter with relatively high delay when the respective receiver detects silence descriptor frames on the radio channel.

In summary, the invention in its various embodiments and aspects has the advantages of the automatic management of a push-to-talk group called function, providing: reduction in coalitions by ensuring a first come first serve basis of channel access; automatic disabling of channel access when the channel is busy; provision for natural pauses in a speakers conversation and provision for the deployment of one or more priority mobiles in a group.

We claim:

1. A mobile radio for operation in a system comprising a plurality of mobile radios, in which each mobile radio transmits, selectively, traffic frames containing traffic data responsive to inputting of information to the mobile radio when the mobile radio is in an active transmit state of operation, and silence descriptor frees responsive to absence of input information when the mobile radio is in active transmit state of operation, the mobile radio comprising:

a transmitter for transmitting traffic on a radio channel;

a receiver for monitoring signals on the radio channel;

a control input for inputting a transmit command;

control means, responsive to the receiver and responsive to the control input, for controlling the transmitter, where the control means are arranged to enable activation of the transmitter, when the receiver detects continuous silence descriptor frames on the radio channel for a predetermined duration and a transmit channel command is input at the control input.

2. A mobile radio according to claim 1, wherein the control means are further arranged to activate the transmitter in response to a transmit command when the receiver detects no traffic frames and no silence descriptor frames on the radio channel.

3. A mobile radio according to claim 1 wherein the control means are further arranged to suppress the transmitter in response to a transmit command when the receiver detects traffic frames on the radio channel.

4. A mobile radio according to claim 1, wherein the control means are arranged to count consecutive silence descriptor frames and to activate the transmitter in response to a transmit command after a predetermined number of silence descriptor frames has passed.

5. A mobile radio according to claim 1, wherein the control means are arranged to activate the transmitter in response to a transmit command if a continuous sequence of silence descriptor frames extending over a predetermined duration has been detected prior to the transmit command.

6. A mobile radio according to claim 1 wherein the transmitter transmits on an uplink radio channel and the receiver monitors signals on the uplink radio channel and wherein the receiver is further arranged to receive traffic on a downlink radio channel.

7. A mobile radio comprising:

a traffic input for inputting traffic information;

a control input for inputting a transmit command;

a transmitter, coupled to the traffic input and to the control input for transmitting onto a radio channel traffic information which is input to the traffic input while a transmit command is input to the control input and for transmitting a no-traffic indicator when no traffic is input to the traffic input and a transmit command is input to the control input;

a receiver for receiving from the radio channel the traffic information and the no-traffic indicator; and control means, responsive to the receiver, for generating a transmitter disable signal when the no-traffic indicator is received by the receiver and for generating a transmitter enable signal when continuous no-traffic indicators continue to be received by the receiver for a predetermined duration.

8. A mobile radio according to claim 7, further comprising indicator means for indicating a transition between a transmitter disable signal and a transmitter enable signal.

9. A mobile radio according to claim 7 wherein the control means are arranged to disable the transmitter when the transmitter disable signal is generated and to enable the transmitter when the transmitter enable signal is generated.

10. A mobile radio comprising:

a traffic input for inputting traffic information;

a control input for inputting a transmit command;

a transmitter, coupled to the traffic input and to the control input, for transmitting onto a radio channel traffic information which is input to the traffic input while a transmit command is input to the control input and for transmitting a no-traffic indicator when no traffic information is input to the traffic input and a transmit command is input to the control input;

a receiver for receiving from the radio channel the traffic information and the no-traffic indicator; and control means, responsive to the receiver, for initially suppressing the transmitter when a transmit command is input to the transmit input and the no-traffic indicator is received by the receiver and for activating the transmitter when a transmit command is input to the control input and no-traffic indicators continue to be received by the receiver for a predetermined duration.

11. A mobile radio system comprising:

a high priority mobile radio comprising:

a high-priority transmitter for transmitting traffic information on a radio channel, a high-priority receiver for monitoring signals on the radio channel, a high-priority control input for inputting a transmit command, high-priority control means, responsive to the high-priority receiver and responsive to the high-priority control input, for controlling the high-priority transmitter; and a low-priority mobile radio comprising:

a low-priority transmitter for transmitting traffic information on the radio channel, a low-priority receiver for monitoring signals on the radio channel, a low-priority control input for inputting a transmit command, low-priority control means, responsive to the low-priority receiver and responsive to the low-priority control input, for controlling the low-priority transmitter, the high-priority control means enabling activation of the high-priority transmitter when the high-priority receiver detects silence descriptor frames on the radio channel and a transmit command is input at the high-priority control input, and the low-priority control means disabling activation of the low-priority transmitter when the low-priority reeiver detects silence descriptor frames on the radio channel and a transmit command is input at the low-priority control input.

12. A mobile radio system according to claim 11, wherein the high-priority control means enables activation of the high-priority transmitter with relatively low delay when the high-priority receiver detects silence descriptor frames on the radio channel and a transmit command is input at the high-priority control input, and the low priority mobile radio enables activation of the low-priority transmitter with relatively high delay when the low-priority receiver detects silence descriptor frames on the radio channel and a transmit command is input at the low-priority control input.

* * * * *